3,167,542
PRODUCTION OF CAPRYLIC LACTAM
Guenther Rapp, Ludwigshafen (Rhine), Germany, assignor to Badische Anilin- & Soda-Fabrik Aktiengesellschaft, Ludwigshafen (Rhine), Germany
No Drawing. Filed Apr. 25, 1961, Ser. No. 105,268
Claims priority, application Germany, Apr. 30, 1960,
B 57,675
2 Claims. (Cl. 260—239.3)

This invention relates to a process for the production of caprylic lactam. More particularly, the invention relates to a process by which cyclooctanone oxime is converted into caprylic lactam by Beckmann rearrangement.

It is known that cyclooctanone oxime can be converted by Beckmann rearrangement into caprylic lactam. According to one of the known processes, cyclooctanone oxime is rearranged to caprylic lactam with sulfuric acid of a concentration of about 94%. In this process, however, only poor yields are obtained. When 85% sulfuric acid is used for the rearrangement of cyclooctanone oxime, caprylic lactam can be obtained in yields of up to 90%. The resulting product is, however, of insufficient purity. According to another process, caprylic lactam is obtained by rearranging cyclooctanone oxime with oleum in the presence of substances such as methanol or phenol. A disadvantage of this process is, however, that the caprylic lactam obtained is contaminated by the substance added. Furthermore, it is difficult in a continuous process to add such substances in a suitable proportion: a high rate contaminates the caprylic lactam, whereas a low rate is not active.

It is an object of this invention to avoid the said disadvantages of prior art processes.

It is another object of this invention to provide a process for the production of extremely pure caprylic lactam.

Another object is the production of caprylic lactam in high yields.

A further object is the production of pure caprylic lactam which is eminently suitable for polymerization.

Further objects will become apparent from the following detailed description.

I have found that caprylic lactam of high purity can be prepared in high yields by Beckmann rearrangement of cyclooctanone oxime containing less than 1% of water with sulfuric acid or oleum having a sulfur trioxide content of from 80% to 81.7% in the absence of special additives.

The cyclooctanone oxime used as starting material in the process according to this invention can be obtained by the usual methods. The starting material should contain less than 1%, preferably less than 0.3%, of water. If the water content is higher than 1%, the water reacts violently with the sulfur trioxide or the concentrated sulfuric acid This results in local overheating and the caprylic lactam formed becomes dark in color and is contaminated by polymeric products.

Dry cyclooctanone oxime for use in this process can be obtained, for example, by reacting cyclooctanone with a solution of hydroxylamine sulfate in the presence of acid-binding reagents at a temperature of between 45° and 100° C. The resulting reaction mixture contains the cyclooctanone oxime as upper, organic layer containing 3 to 5% of water. This crude cyclooctanone oxime is then dried in the usual manner. Drying processes in which the oxime is heated to high temperatures only for a short period or which are carried out at room temperature or only moderately elevated temperatures are preferred. The fused oxime may, for example, be dried continously in a falling film evaporator.

The sulfuric acid used for the rearrangement of the cyclooctanone oxime should have a concentration of at least 98% which is equivalent to an $SO_3$ content of 80%. 99 to 100% sulfuric acid is preferred. The maximum content of free sulfur trioxide in the sulfuric acid employed in the process of this invention is 0.5%, equivalent to sulfuric acid containing 81.7% of $SO_3$.

In the rearrangement process according to this invention, there is used 1 to 2, preferably 1.4 to 1.6, parts of sulfuric acid per part of cyclooctanone oxime. The temperature for the rearrangement process is between 108° and 120° C., preferably between 111° and 113° C. The time required for the rearrangement is from about 10 to 30 minutes. The reaction mixture may be worked up, for example, by neutralizing the mixture, separating the lactam oil formed, extracting the lactam oil with a solvent, e.g., with benzene or a halogenated hydrocarbon such as chloroform, distilling off the solvent and fractionating the caprylic lactam in vacuo.

It is highly surprising that caprylic lactam can be obtained by rearrangement of cyclooctanone oxime with concentrated sulfuric acid in nearly quantitative yields and substantially free from contaminations when the beforementioned critical conditions are observed.

The invention will be further illustrated by, but is not limited to, the following examples. The parts specified in the examples are by weight.

Example 1

100 parts/hour of cyclooctanone oxime containing less than 0.2% of water and 150 parts/hour of 100% sulfuric acid is supplied continuously to a reaction system filled with 100% sulfuric acid and provided with a mixing device and a soaking tube which permits soaking periods of from 10 to 30 minutes. The temperature in the reaction system and in the soaking tube is maintained at about 112° C. The reaction mixture leaving the soaking tube is continuously neutralized with ammonia at a temperature of below 50° C. The neutralized reaction mixture, which is free from oligomers and polymers of caprylic lactam, and contains only very small amounts of cyclooctanone and cyclooctanone oxime, is extracted with benzene. After the benzene has been distilled off, the reaction product is distilled under reduced pressure. 95.2 parts/hour of caprylic lactam are obtained. The product contains less than 0.1% of cyclooctanone oxime, less than 0.1% of cyclooctanone and no oligomers or polymers of caprylic lactam.

Examples 2 to 8

The following examples are carried out under the same conditions as Example 1, with the exception that sulfuric acid of different concentration is used.

| | Acid concentration | | Contaminations in crude caprylic lactam | | |
|---|---|---|---|---|---|
| Example | $SO_3$ content of sulfuric acid or oleum, respectively, percent | Concentration of sulfuric acid, percent | Polymeric products, percent | Cyclooctanone, percent | Cyclooctanone oxime, percent |
| 2 | 76.7 | 94.0 | 0 | 1.2 | 7.0 |
| 3 | 79.2 | 97.0 | 0 | 0.6 | 3.2 |
| 4 | 80.8 | 99.0 | 0 | 0.1 | 0.1 |
| 5 | 81.4 | 99.8 | 0 | 0.07 | (²) |
| 6 | 81.7 | ¹ 0.4 | 0 | 0.004 | (²) |
| 7 | 82.0 | ¹ 1.7 | 16.5 | 0.002 | (²) |
| 8 | 82.7 | ¹ 5.7 | 80.5 | | |

¹ Content of free $SO_3$ in oleum.
² Undetectable by infrared analysis.

Examples 2 and 3 show that, when 94 or 97% sulfuric acid is used, the crude caprylic lactam is strongly contaminated by cyclooctanone oxime. The improvement achieved by working according to this invention is evident from Examples 4, 5 and 6. When 99 or 99.8% sulfuric acid or 0.4% oleum is used for the rearrangement, only traces of cyclooctanone oxime, or no cyclooctanone oxime at all, can be detected in the crude caprylic lactam by infrared analysis. The cyclooctanone content is less than 0.1%. If, however, as shown in Examples 7 and 8, sulfuric acid is used which contains 1.7 or 5.7% of free sulfur trioxide, oligomeric and polymeric products of caprylic lactam are obtained in addition to the monomeric caprylic lactam.

The contaminations, such as cyclooctanone and cyclooctanone oxime, which are present in the crude caprylic lactam obtained according to Examples 2 and 3 cannot be completely removed by extraction and/or distillation. It is of the highest importance, however, that caprylic lactam should be free from such contaminations, because otherwise the polycaprylic lactam obtained by polymerization of caprylic lactam would be yellow and could therefore not be used for the preparation of fibers or similar products. The formation of polymers and oligomers of caprylic lactam, which is observed in Examples 7 and 8, diminishes the yield of monomeric caprylic lactam and makes the process uneconomical.

I claim:
1. In a process for the production of caprylic lactam by rearrangement of cyclooctanone oxime with sulfuric acid at temperatures of between 108° and 120° C., the improvement which comprises using cyclooctanone oxime which contains less than 1% of water and sulfuric acid which contains from 80 to 81.7% of sulfur trioxide.

2. In a process for the production of caprylic lactam by rearrangement of cyclooctaone oxime with sulfuric acid at temperatures of between 108° and 120° C., the improvement which comprises using cyclooctanone oxime which contains less than 0.3% of water and sulfuric acid which contains from 80 to 81.7% of sulfur trioxide.

References Cited in the file of this patent
UNITED STATES PATENTS

| | | |
|---|---|---|
| 2,249,177 | Schlack | July 15, 1941 |
| 2,351,381 | Wiest | June 14, 1944 |
| 2,822,394 | Nicolaisen | Feb. 4, 1958 |
| 2,883,377 | Von Schick et al. | Apr. 21, 1959 |
| 2,945,885 | Von Schick et al. | July 19, 1960 |
| 2,976,282 | Runge | Mar. 21, 1961 |